US008913244B1

(12) United States Patent
Broughton

(10) Patent No.: US 8,913,244 B1
(45) Date of Patent: Dec. 16, 2014

(54) METHODS, SYSTEMS, AND APPARATUS FOR END OF LINE TESTING

(75) Inventor: Kevin Charles Broughton, Sharpsburg, GA (US)

(73) Assignee: Cooper Technologies Company, Houston, TX (US)

( * ) Notice: Subject to any disclaimer, the term of this patent is extended or adjusted under 35 U.S.C. 154(b) by 579 days.

(21) Appl. No.: 13/207,893

(22) Filed: Aug. 11, 2011

Related U.S. Application Data

(60) Provisional application No. 61/373,125, filed on Aug. 12, 2010.

(51) Int. Cl.
*G01J 3/46* (2006.01)
*G01N 21/93* (2006.01)
*G01N 21/27* (2006.01)

(52) U.S. Cl.
USPC ........... 356/398; 356/121; 356/421; 356/448; 356/238; 356/243.5

(58) Field of Classification Search
USPC ......... 356/392, 388, 408, 421, 121, 398, 448, 356/238, 243.5
See application file for complete search history.

(56) References Cited

U.S. PATENT DOCUMENTS 4,886,366 A * 12/1989 Kogure ........................ 356/406
7,339,665 B2 * 3/2008 Imura ........................ 356/243.1
7,710,559 B2 * 5/2010 Imura ........................ 356/243.8
2003/0036860 A1 * 2/2003 Rice et al. ........................ 702/57
2011/0195531 A1 * 8/2011 Sohn et al. ........................ 438/16

OTHER PUBLICATIONS

Candle Power Forums, conversation thread entitled "My 'Light Box' or poor man's Integrating Sphere . . . with fan cooled HS!", started by wquiles dated Mar. 18, 2006, http://www.candlepowerforums.com/vb/showthread.php?111538-My-quot-Light-Box-quot-or-poor-man-s-Integrating-Sphere.*

* cited by examiner

Primary Examiner — Tarifur Chowdhury
Assistant Examiner — Rebecca C Bryant
(74) Attorney, Agent, or Firm — King & Spalding LLP

(57) ABSTRACT

A testing box for testing light sources, the testing box comprising: an enclosure comprising an opening for receiving a light source; a sensor of a light property for light emitted inside the enclosure; and a comparator of the light property sensed by the sensor and a shifted test box boundary for the light property, wherein the shifted test box boundary is based on a correlation between a measured light property of a test light source in an integrating sphere and a measured light property of the test light source in the testing box. A method for testing a light source for compliance with a standard, comprising: obtaining a first measurement of a first property of a first light source in a reference measuring device; obtaining a second measurement of the first property of the first light source in a testing measuring device; determining the difference between the first measurement and the second measurement; and determining an adjusted standard value based on a correlation between the first measurement and the second measurement.

12 Claims, 17 Drawing Sheets

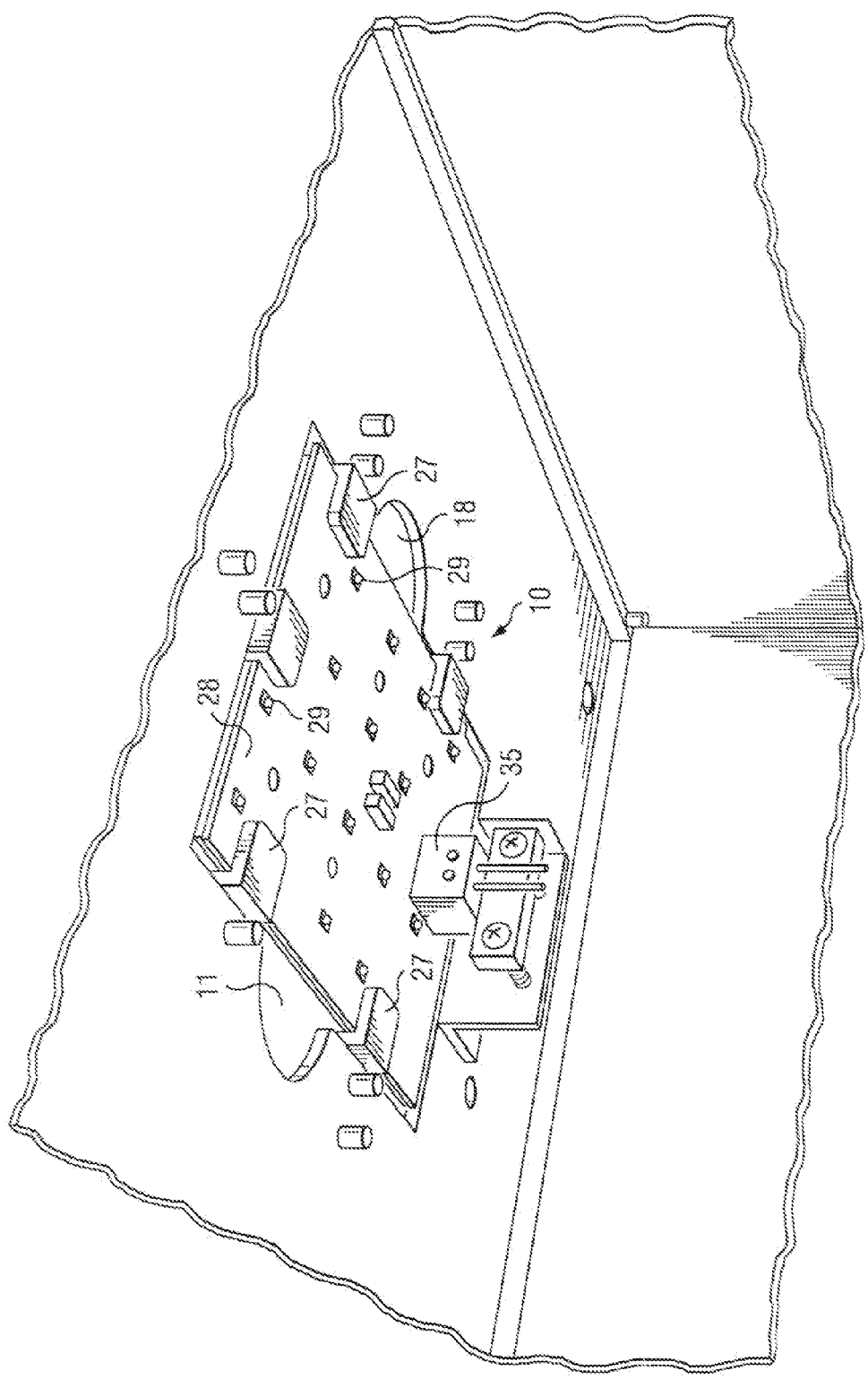

METHODS, SYSTEMS, AND APPARATUS FOR END OF LINE TESTING

CROSS-REFERENCE TO RELATED APPLICATIONS

This application claim priority to U.S. Provisional Application No. 61/373,125, filed Aug. 12, 2010, the disclosure of which is hereby incorporated by reference.

TECHNICAL FIELD

The present invention relates to methods and apparatuses for manufacturing lighting devices. More specifically, the invention relates to methods, systems, and apparatus for testing of light output and color in a manufacturing environment.

BACKGROUND

The lighting industry is in the midst of a sea change. Driven by a need to provide light sources that require less energy while providing the same amount of light as conventional devices, the industry has moved from high wattage incandescent lamps to more economical fluorescent lamps, including compact fluorescent lamps that can be used in a standard incandescent fixture. As technology continues to develop, fixtures using light emitting diodes (LEDs) have also seen some limited acceptance in the market.

LEDs are solid-state semiconductor devices that emit light when current is applied. LEDs can be highly advantageous over incandescent lamps because LEDs can provide a similar amount of light in a much smaller package that uses much less energy. LEDs also tend to have a much longer useful life than either fluorescent or incandescent lamps.

Despite the many advantages of LED lamps, several factors stand in the way of widespread adoption for household and business lighting applications. First, it is difficult to produce white light with LEDs. Traditional LED technologies result in colored light, typically in shades of red, green, or blue. Although technology exists to create white light with LEDs, this technology adds to the expense of production, and also may not reliably produce a shade of white that is pleasing to consumers, or satisfies certain legal or regulatory requirements. Further, LED lamps can have inconsistent color temperature and light output, as compared to conventional incandescent or fluorescent lamps. This leads to a requirement that each LED lamp produced be tested extensively to ensure that its light output meets specifications, including outputting light with the proper color temperature. This can be particularly important with respect to marketing. Lamp manufacturers find it advantageous to indicate the color temperature of the light output from the lamp (conventionally measured in degrees Kelvin), as well as the total light output (measured in lumens), on their packaging. Making such representation on packaging, however, requires a consistent LED product. One way to verify the consistency of color temperature and total light output of LED products is through testing every individual LED product produced.

Conventionally, this testing has been completed using integrating spheres. Conventional integrating spheres, as the name implies, are typically spherical in shape, have an internal surface colored flat white, and incorporating precision optical measuring equipment. Major manufacturers of integrating spheres include: Sphereoptics, Labsphere, Radiant Imaging, and Orboptronix. When a lamp is introduced into an integrating sphere, the sphere measures precisely the chromaticity values of the light output of the lamp from which color temperature is calculated (expressed in degrees Kelvin) and the total light output (expressed in lumens). Accordingly, depending on the results of an integrating sphere test, it can be determined whether the light output of a given LED lamp meets specifications so as to be appropriate for consumers. Integrating spheres, however, are very expensive, often costing many tens of thousands of dollars. For manufacturers operating multiple LED lamp manufacturing lines, the cost of integrating spheres can cause manufacturing costs to become prohibitive. Thus, it is cost prohibitive to test the chromaticity and total light output of every LED lamp manufactured via conventional integrating spheres.

SUMMARY

In accordance with the teachings of the present disclosure, disadvantages and problems associated with testing individual luminaires are overcome.

According to one aspect of the invention, there is provided a method for testing a light source for compliance with a standard, comprising: obtaining a first measurement of a first property of a first light source in a reference measuring device; obtaining a second measurement of the first property of the first light source in a testing measuring device; determining the difference between the first measurement and the second measurement; and determining an adjusted standard value based on a correlation between the first measurement and the second measurement.

According to a further aspect of the invention, there is provided a testing box for testing a light source, the testing box comprising: an enclosure comprising an opening for receiving a light source; a sensor of a light property for light emitted inside the enclosure; and a comparator of the light property sensed by the sensor and a shifted test box boundary for the light property, wherein the shifted test box boundary is based on a correlation between a measured light property of a test light source in an integrating sphere and a measured light property of the test light source in the test box.

Still another aspect of the invention provides a method of testing a light source, the method comprising: providing a testing box capable of accommodating the light source; measuring the chromaticity of a test light source in an integrating sphere; generating a color boundary for the measured chromaticity of the test light source in the integrating sphere; measuring the chromaticity of the test light source in the testing box; shifting the color boundary based on a correlation between the measured chromaticities of the test light source in the integrating sphere and the testing box; and measuring the chromaticity of the light source in the testing box.

A further aspect of the invention provides a method of testing lumen output of a light source in a testing box, the method comprising: measuring the lumen output of a test light source in an integrating sphere; measuring the lumen output of the test light source in the testing box; measuring the lumen output of a subject light source in the testing box; and determining the actual lumen output of the subject light source by multiplying the measured lumen output of the subject light source in the testing box by the measured lumen output of the test light source in the integrating sphere and dividing by the measured lumen output of the test light source in the testing box.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features. Reference will now be made to the accompanying drawings, which are not necessarily drawn to scale, and wherein:

FIG. 6D is a perspective view of the testing box of FIGS. 6A-6C, wherein the view is from the interior of the box;

Figure 1:
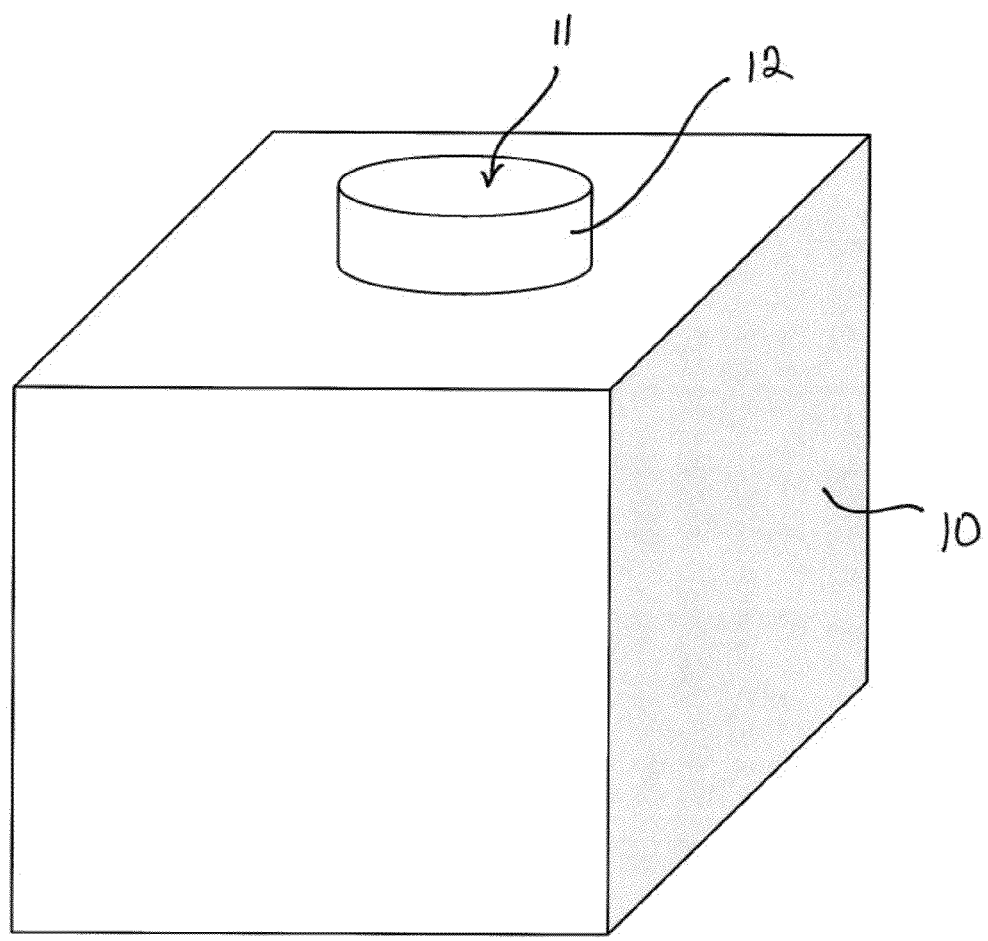
FIG. 1 is a perspective view of a testing box having a cubic shape.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION

Preferred embodiments and their advantages over the prior art are best understood by reference to FIGS. 1-14 below. However, the present disclosure may be more easily understood in the context of a high level description of certain embodiments.

To reduce the manufacturing costs associated with LED lamps, methods and apparatuses are provided that allow testing of LED lamps that is sufficiently accurate as compared to testing with integrating spheres, yet much less expensive. Accordingly, one exemplary embodiment allows for reduced manufacturing cost and increased manufacturing speed.

Throughout this specification, the term "lamp" means a light source, for example, an LED package, a halogen light bulb, or any other light source. Throughout this specification, the term "luminaire" means a device that uses a lamp, for example, a light fixture. Throughout this specification, the term "light source" means any source of light and expressly includes both lamp and luminaire.

The inventive process and apparatus allows for simple and compact optical and electrical testing of every single unit produced on an LED luminaire assembly cell. The testing box may be used to test the LEDs. An in-house manufactured testing box, which is not accurate by itself, may be correlated to actual optical measurements by optical comparisons to a standard integrating sphere. Testing boxes may be custom built as to size and shape so as to accommodate the size and functionality based on each specific product to be tested. The testing boxes may be used in "end of line" testing stations, which test each LED at the ends of the production lines.

Testing boxes may be used to test any light color characteristic or property. For example, testing boxes may be used to test: chromaticity, lumen output, color rendering index, and wavelength.

In one exemplary embodiment, a testing box 10 takes the place of an integrating sphere in the testing process. One exemplary testing box is shown in FIG. 1. As shown in FIG. 1, the exemplary testing box is a rectangular shape having solid walls with an opening at one end wherein a light fixture can be attached. In certain exemplary embodiments, the interior of the testing box (not shown) may be painted with flat white paint. One exemplary testing box, shown in FIG. 1, may be constructed from medium density fiberboard. Alternatively, the box can be constructed from any suitable material that is sufficiently rigid so as to hold its shape, and sufficiently strong so as to be able to support a lighting unit under test. Although the exemplary box is generally shaped as a rectangular cuboid, there are no particular limitations on the size and shape of the box, other than the box may be sufficiently large such that it can support an opening sufficiently large to envelop the lamp of a given unit under test. The box can be any opaque polyhedron or other three-dimensional shape.

As shown in FIG. 1, the box 10 may include an opening 11 for receiving light from the lighting unit under test. In the exemplary embodiment, all of the light from the unit under test is received into the opening 11. Alternatively, a portion of the light may be received into the opening. The testing box 10 may also be fitted with a collar, door, or other apparatus for coupling the lighting unit to the testing box and the opening such that the light from the lighting unit is directed into the testing box. The exemplary testing box 10 of FIG. 1 includes an opening 11 and a collar 12 designed to receive a downlight fixture (not shown). A glass or polycarb lens or any other clear material known to persons of skill may cover the opening 11 to keep the inside of the testing box free of dirt and debris.

Figure 2A:
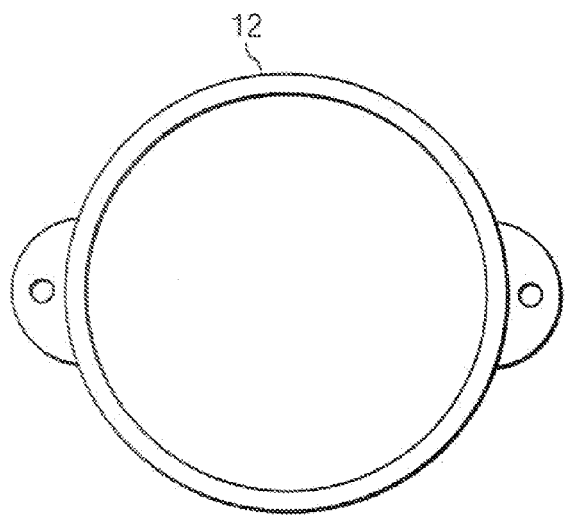
FIG. 2A is a top view of a collar, which serves as a mount for a lamp and/or fixture at an opening of a testing box.
Figure 2B:
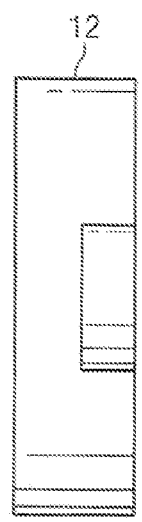
FIG. 2B is a side view of the collar of FIG. 2A.
Figure 2C:
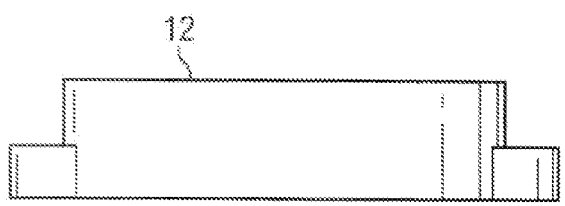
FIG. 2C is a front view of the collar of FIGS. 2A and 2B.
Figure 2D:
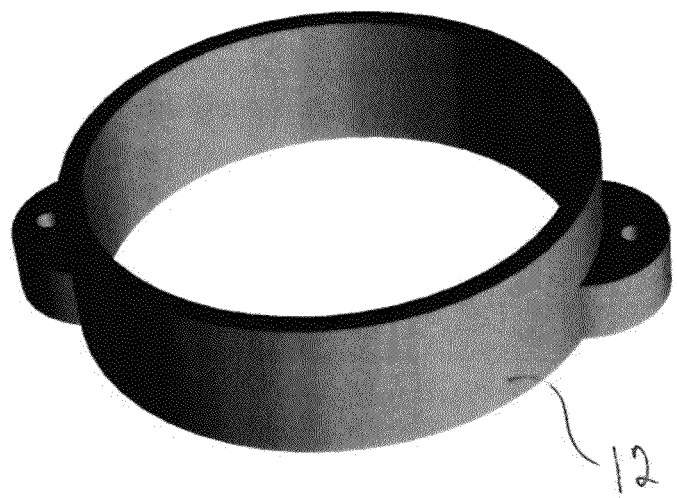
FIG. 2D is a perspective view of the collar of FIGS. 2A-2C.

FIGS. 2A, 2B and 2C show top, side and end views, respectively, of an exemplary collar 12 for coupling the testing box to a downlight fixture. The collar 12 has a cylindrical structure with two flanges extending from opposite sides of the cylinder. The flanges enable the collar to be mounted to the top of the testing box at the opening in the testing box. FIG. 2D illustrates a perspective view of the collar. In alternative embodiments, the collar may be a series of concentric rings that overlap each other so as to accommodate a variety of lamp fixture sizes. Thus, depending on the diameter of the lamp fixture to be tested, rings may be added/removed to/from the collar to produce a smaller/larger opening.

Figure 3:
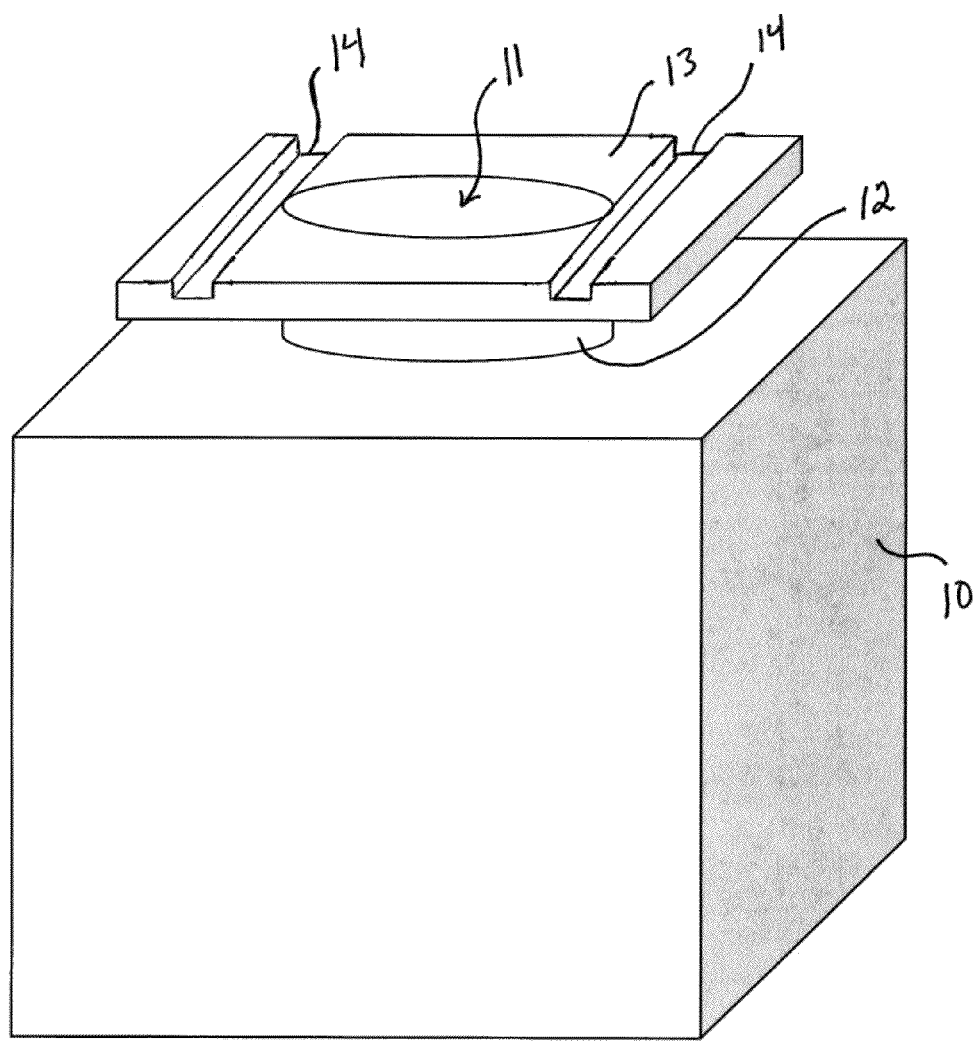
FIG. 3 is a perspective view of a testing box having a fixture tray mounted to a collar.

As shown in FIG. 3, additional testing aids may also be attached to the testing box to aid in the testing process. Attached to the testing box 10 in FIG. 3 is a fixture tray 13 with two grooves 14 alongside the opening 11 and collar 12. The grooves 14 in the fixture tray 13 may be disposed so as to accommodate hangar bars associated with a standard downlight fixture (not shown). When the hangar bars (not shown) are inserted into the grooves 14, it is assured that the fixture (not shown) is in the appropriate position.

Figure 4:
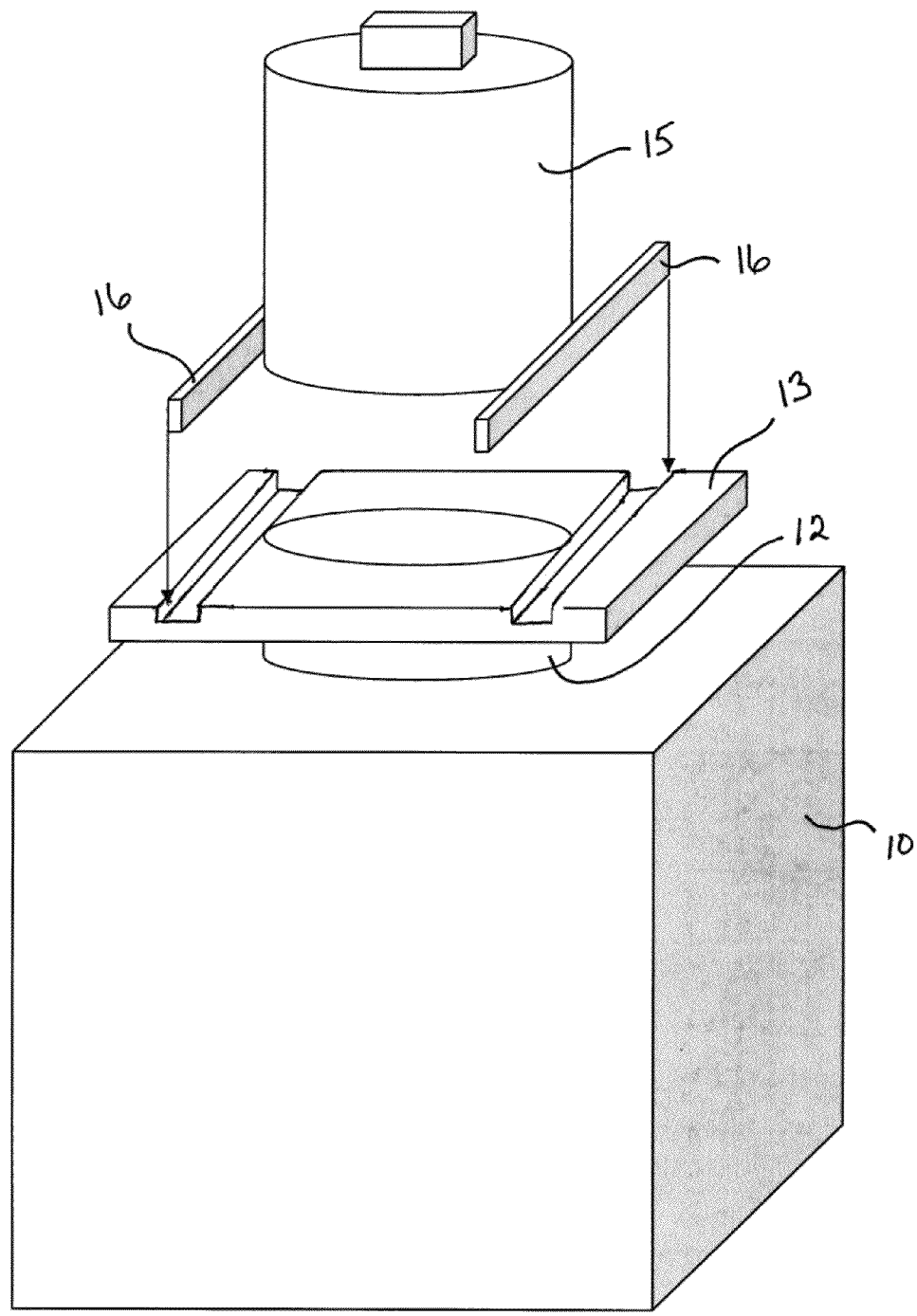
FIG. 4 is a perspective view of a testing box having a fixture tray mounted to a collar, wherein a light fixture to be tested is being inserted into the fixture tray.

FIG. 4 demonstrates a downlight fixture 15 in place on the testing box 10 with collar 12 and fixture tray 13 attached. The grooves 14 in the fixture tray 13 may be disposed so as to accommodate hangar bars 16 associated with a standard downlight fixture 15. As one of skill in the art would understand, the opening 11 and attachment mechanism would differ depending on the physical properties of the lighting fixture 15 that is to be attached thereto.

Figure 5:
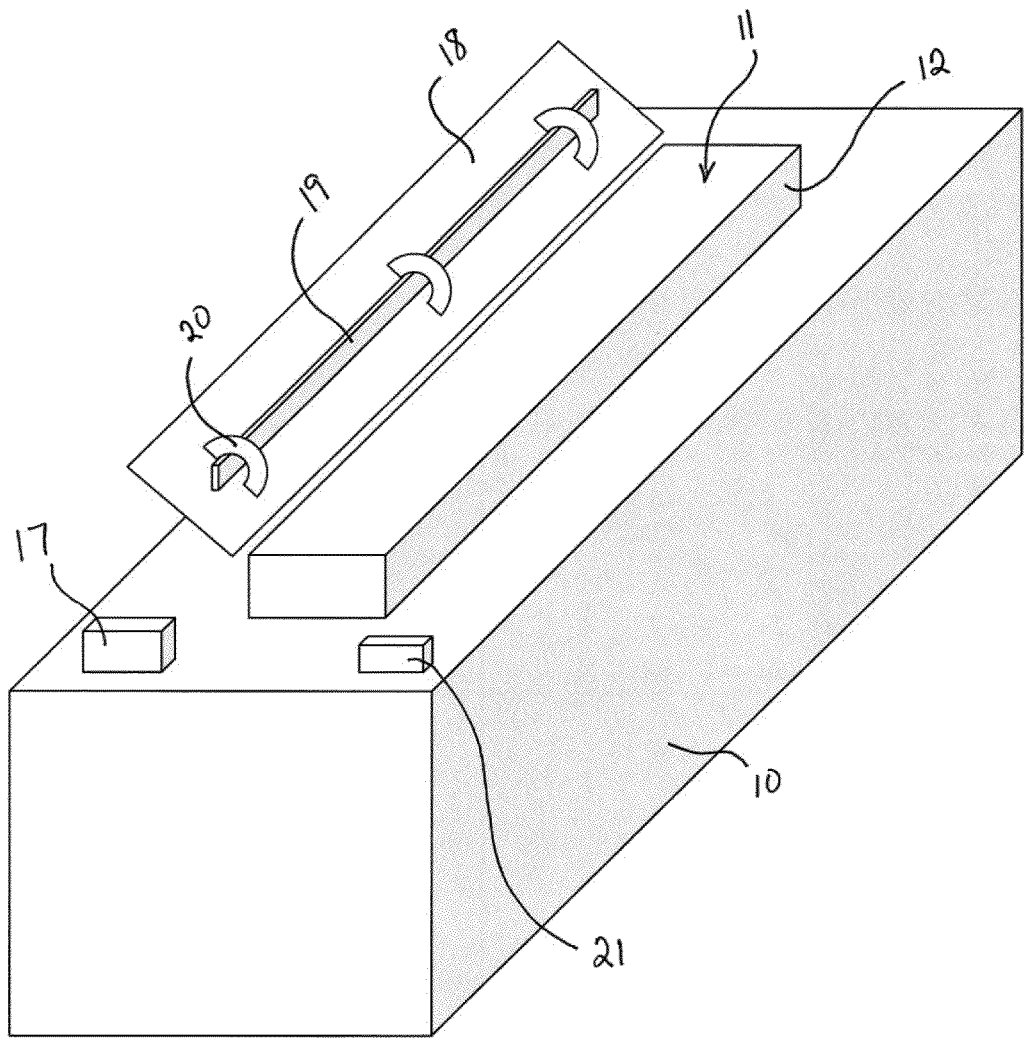
FIG. 5 is a perspective view of a test box in the shape of a parallelepiped, specifically a rectangular parallelepiped.

In an alternative embodiment shown in FIG. 5, a box is constructed with a door-like mechanism 18 for testing a linear fixture 19. Also shown in FIG. 5 is a bar code scanner 17 associated with the testing facility. The bar code scanner 17 can read a UPC code associated with a serial number of the unit under test, and can store the test results for that unit in a computer. This allows the individual test results for a given unit to be retrieved at a later time. The alternative test box 10 shown in FIG. 5 may be made from sheet metal rather than medium density fiberboard. The test box 10 includes a rectangular opening 11 to accommodate a linear 19, wherein the linear 19 is coupled to the door 18 by way of three clips 20. Alternatively, one of skill in the art would understand that the linear 19 can be coupled to the door 18 through any number of methods suitable to hold the linear in place on the door 18 during the duration of the test. Power can be routed to the unit under test through the door 18 or any other portion of the testing box 10, and switched on and off with a switch box 21 coupled to a side of the testing box 10. In one exemplary embodiment, when the door 18 is closed, the unit under test is completely enclosed inside of the testing box 10.

Figure 6A:
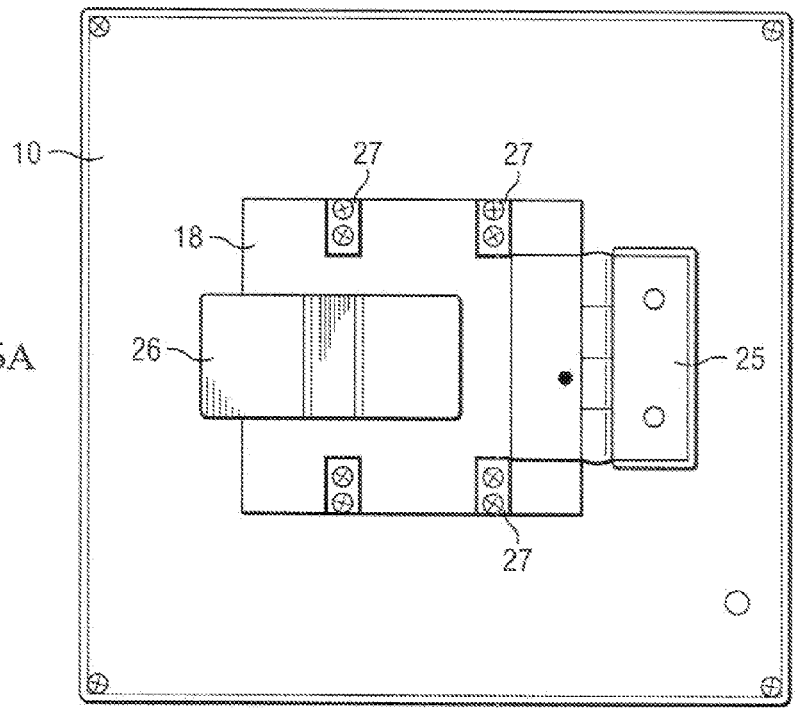
FIG. 6A is a top view of a testing box for testing printed circuit board LED light arrays.
Figure 6B:
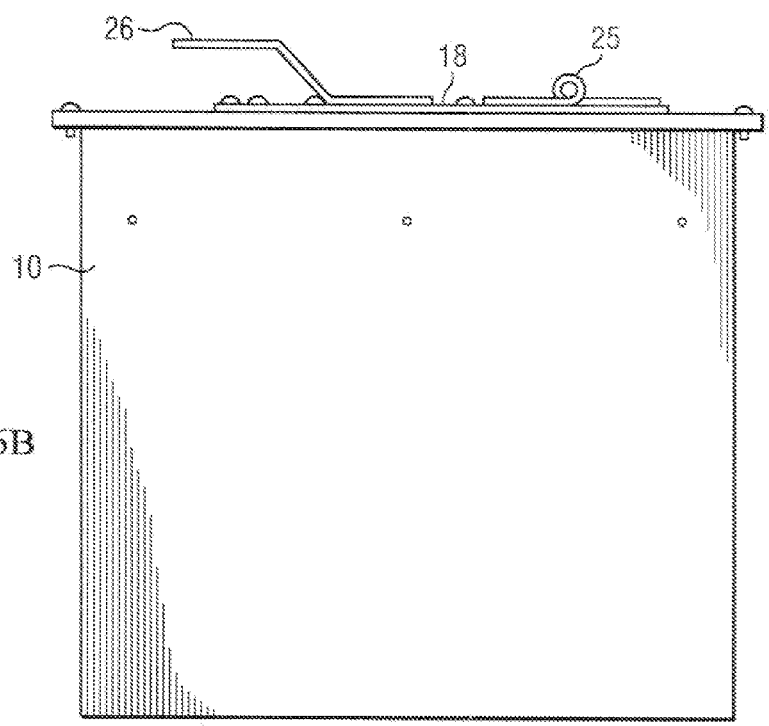
FIG. 6B is a side view of the testing box of FIG. 6A.
Figure 6C:
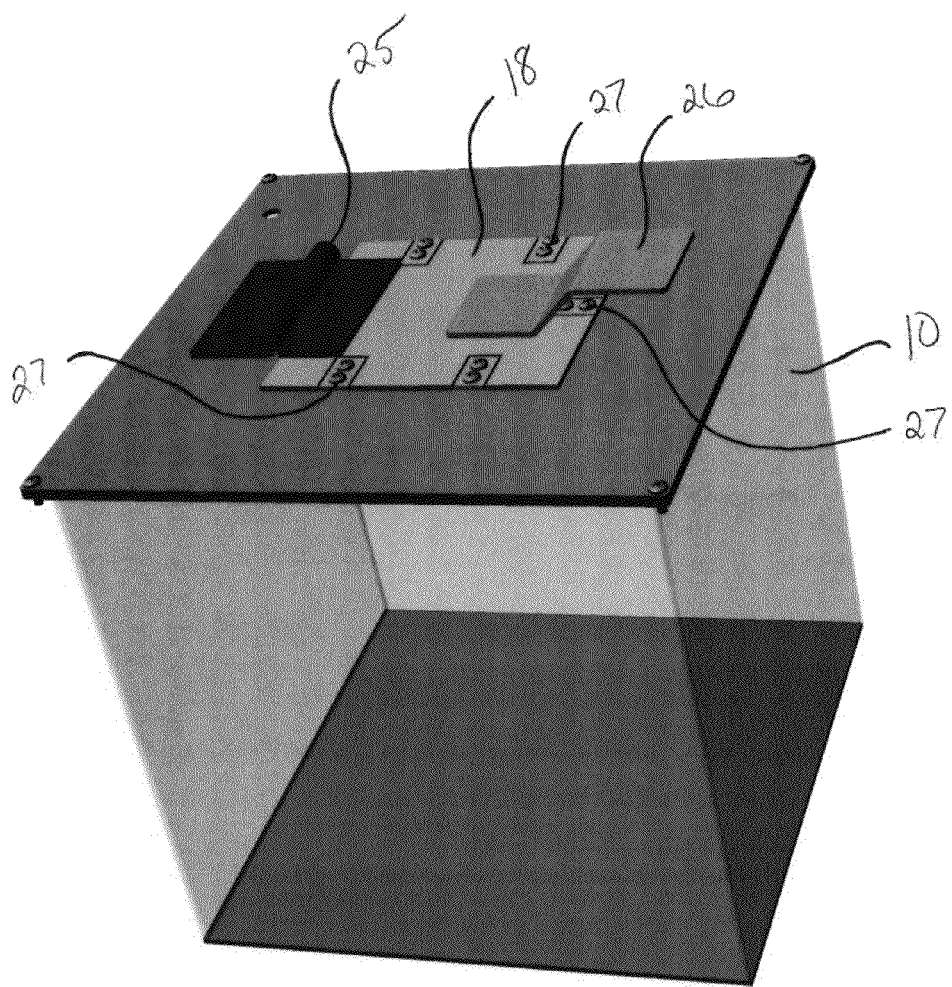
FIG. 6C is a perspective view of the testing box of FIGS. 6A-6B.

In yet another exemplary embodiment, the testing box can be modified to allow for the testing of LED lamps attached to printed circuit boards. FIGS. 6A-6D illustrate different views of an exemplary testing box 10 for the testing of LED lamps attached to printed circuit boards. FIG. 6A is a top view of the testing box 10. A door-like mechanism 18 is connected to the top of the testing box 10 via a hinge 25. A handle 26 is attached to the top of the door-like mechanism 18 for easy opening/closing. Z-shaped brackets 27 are positioned around the door-like mechanism 18 and extend down into the opening (not shown) in the top of the testing box 10. The Z-shaped brackets 27 suspend the printed circuit board in the opening under the door-like mechanism 18. The door-like mechanism 18 has notches at its periphery to accommodate the Z-shaped brackets 27. FIG. 6B is a side view of the testing box 10 shown in FIG. 6A. From this angle, the hinge 25 and handle 26 are clearly visible. FIG. 6C is a perspective view of the testing box 10 shown in FIGS. 6A and 6B, wherein the hinge 25 and handle 26 are at opposite ends of the door-like mechanism 18. FIG. 6D is a perspective view from inside the testing box of the under-side of the top of the testing box 10. A printed circuit board 28 is suspended by the Z-shaped brackets 27 in the opening 11 of the testing box 10. The printed circuit board 28 has an array of LEDs 29. The door-like mechanism 18 is closed above the printed circuit board 28. It may be the case with PCB- and MCPCB-based LED lamps that they rely on a power supply that is not integrated with the PCB. Further, in operation, the external power supply may connect to the PCB through a very small plug, such as a MOLEX connector, or through even smaller solder points. A power supply 35 is provided in the testing box 10 to supply power to the printed circuit board 28.

PCB-based lamps may not always have a fixture that allows for the lamp to be sealed to a testing box (as is possible with, by way of example, the downlight fixture shown above in FIG. 4. Accordingly, in one exemplary embodiment, testing a PCB-based lamp includes sealing the PCB inside the box while receiving power from outside of the box. The door mechanism shown in FIG. 6D provides this capability. The PCB can either be mounted to the inside of the door or suspended under the door via Z-shaped brackets, and then the door may be made to seal the opening of the testing box. The test points of the power supply 35 provide connection points for an external power supply on the outside of the box, and on the inside of the box provide pins that can either contact the power supply inputs on the PCB directly, or can be wired to the power supply inputs.

The interior of the testing boxes may be a flat white color. The interior surface may be diffuse, matte or flat and reflective. The interior surfaces may be painted with Krylon 1502 Indoor/Outdoor flat white paint. In some embodiments, satisfactory paints are those which do not fluoresce, but other embodiments, fluorescent paints or surfaces work.

Figure 7:
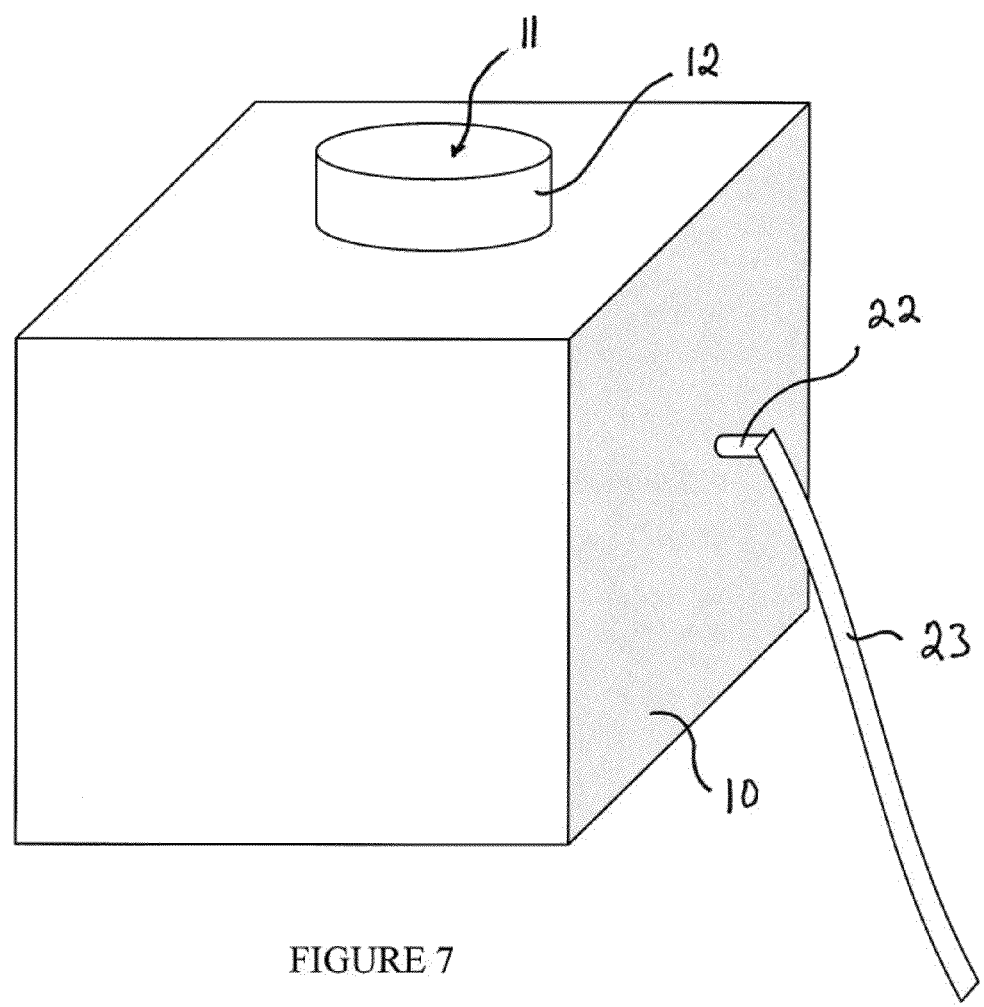
FIG. 7 is a perspective view of a testing box having a sensor and a fiber optic cable.

With respect to the testing box 10 itself, without regard to the type of fixture or lamp associated with the testing box, in an exemplary embodiment, the testing box is configured to receive a sensor for detecting the light within the box. FIG. 7 shows one exemplary embodiment of the testing box further illustrating a fiber-optic cable 23 entering the testing box connected to a sensor 22. Inside the testing box 10 there can be a shielding baffle (not shown) installed on the wall that blocks the sensor's direct view of the luminaire as seen through the opening 11 in the testing box 10. In some embodiments, the sensor 22 is merely an exposed end of a fiber optic cable 23. In some embodiments, the sensor 22 is a spectrometer 41 (see FIG. 12) at the opposite end of the fiber optic cable 23.

Any type of sensor may be used, including: hand-held illuminance or luminance meter capable of measuring chromaticity, CCD camera, photodetector fitted with appropriate filters, or any other sensor known to persons of skill in the art.

Figure 8A:
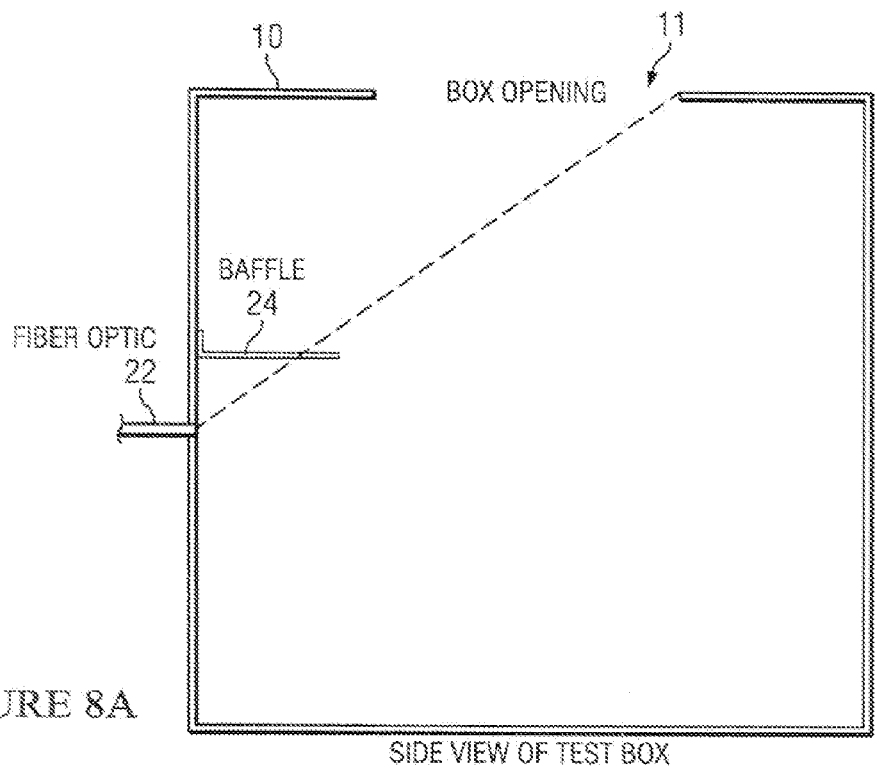
FIG. 8A is a cross-sectional side view of a testing box having a sensor, a baffle and an opening.
Figure 8B:
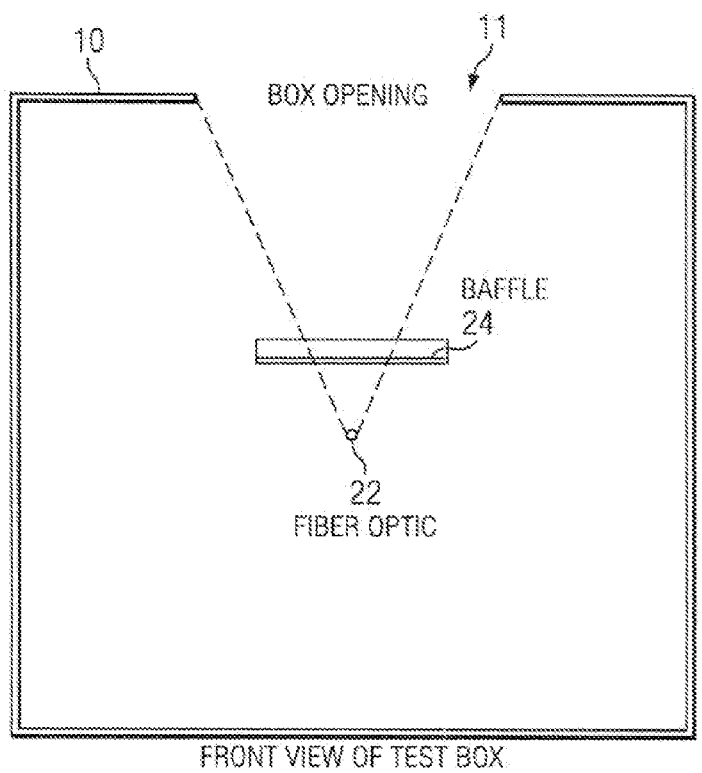
FIG. 8B is a front view of the testing box of FIG. 8A.

Referring to FIGS. 8A and 8B, side and front views, respectively, of a testing box are shown. In this exemplary embodiment, as shown in FIG. 8A, the sensor 22 is exposed to as much of the interior surfaces of testing box 10 as possible without also exposing the sensor 22 to the opening 11. As shown in FIG. 8A, in an exemplary embodiment, the baffle 24 is sized so as to block any direct line of sight (represented by the dashed lines) between the unit under test (not shown) in the opening 11 and the sensor 22. In the exemplary embodiment shown in FIG. 8A, the baffle extends approximately one inch beyond the minimum size needed to block a direct line of sight. As one of skill in the art would understand, the precise sizing and shaping of the baffle can vary from application to application, depending on the size and shape of the unit under test, the testing box, the opening, and the positioning of the fiber optic cable.

Testing boxes of the present invention may take a variety of shapes. For example, the testing box may be: cube, rectangular, spherical, cylindrical, hemispherical, soccer ball shaped (truncated icosahedron), any enclosed polyhedron, or any other shape known to persons of skill. The testing box may be constructed of any suitable material, for example, plastic, aluminum, steel, wood, or any rigid opaque material. Depending on the shape and size of the lamp and/or fixture to be tested, the testing box may be customized to accommodate the lamp and/or fixture. Testing box shapes that are not sphere-shaped do not produce a full lumen reading, however, this lumen loss reading may be accounted for via the correlation explained below. No matter what the shape of the testing box, the sensor may be placed in the testing box relative to the opening so that there is not a direct line of sight between the opening and the sensor. A baffle or a plurality of baffles may be included inside the testing box as a barrier between the sensor and the opening to prevent a direct line of sight.

Figure 9:
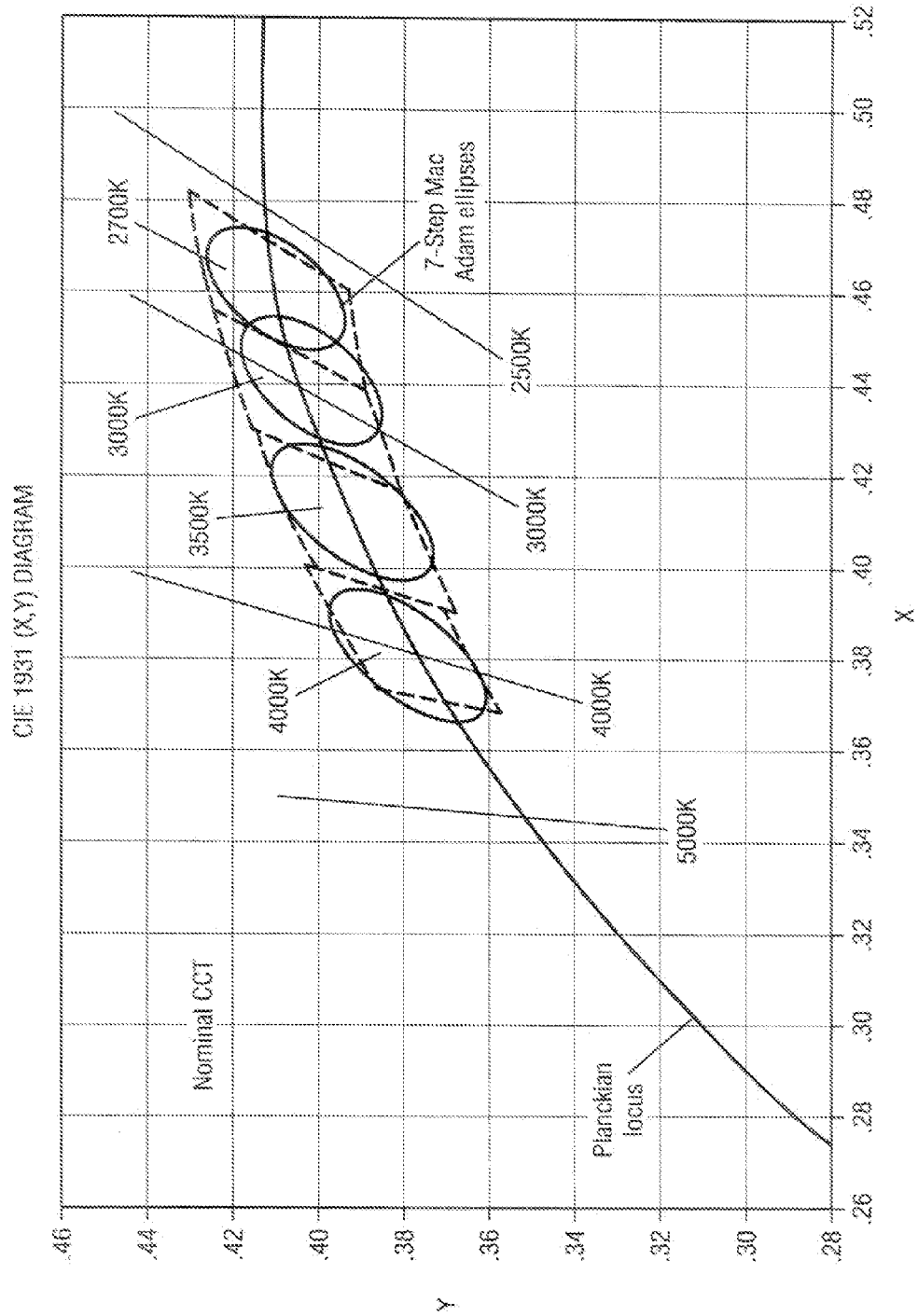
FIG. 9 is a 1931 CIE diagram of the x and y coordinates for chromaticity, wherein 7-step MacAdam ellipses are identified.

When measuring color temperature of the light output from the lamp (conventionally measured in degrees Kelvin), as well as the total light output (measured in lumens), conventionally, the output from an integrating sphere is provided to a spectrometer, which provides the color temperature to a computer. The computer can then determine where on the CIE ("International Commission on Illumination") diagram the chromaticity of the output of a luminaire appears. The CIE diagram is shown in FIG. 9. The CIE diagram shown in FIG. 9 provides a number of MacAdam ellipses, which define a region on the CIE diagram wherein light having a chromaticity falling anywhere within the ellipse would be generally indistinguishable to the human eye. The MacAdam ellipses shown in FIG. 9 are further bounded by quadrangles. The quadrangles represent a range of chromaticity coordinates that, according to the American National Standards Institute (ANSI) can be legitimately characterized as having a given color temperature. By way of example, a lamp having an (x, y) chromaticity value of (0.48, 0.43) can be fairly characterized as having a color temperature of 2,700 Kelvin. As a further example, a lamp having an (x, y) chromaticity value of (0.44, 0.39) can also be fairly characterized as having a color temperature of 2,700 Kelvin.

While ANSI boundaries may be used to define a color boundary, it should be noted that any color boundary may be used as the specification criteria for end of line testing. For example, the boundary specification may be based on advertising requirements for lamps and/or light fixtures, applications for lamps and/or fixtures, such as indoor, outdoor, residential, industrial applications, type of luminaire, lamp and/or light fixture, validation of manufacturer lamps and/or light fixtures, special lighting requirements such as holiday lighting, and custom color requirements.

Figure 10:
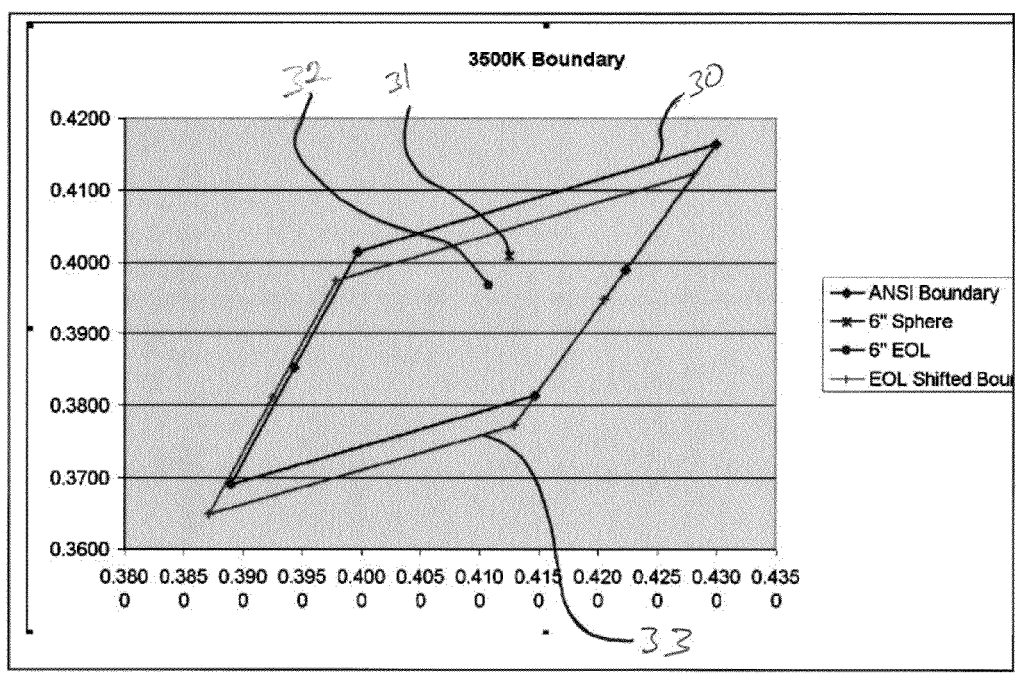
FIG. 10 is a graph of an ANSI boundary and End of Line boundary for a testing box, for a nominal color temperature 3500K.

The integrating sphere properly equipped with a light measuring device is considered the gold standard in measuring chromaticity coordinates and light output to determine whether the output of a lamp falls within the proper quadrangle on the CIE diagram. When a spectrometer is connected to a testing box of the present invention, however, the measurements may differ. Accordingly, the present invention provides a method for correlating measurements taken in an integrating sphere to measurements taken in a testing box. By way of example, when a lamp is measured for chromaticity in an integrating sphere, the output may be represented as shown in FIG. 10. FIG. 10 shows a graph wherein the x-axis is CIE x and the y-axis is CIE y. The ANSI boundary 30 for chromaticity lamp output, which is a quadrilateral bounded by dots in the graph, can fairly be characterized as having a color temperature of 3,500 degrees Kelvin. The chromaticity output 31 of a test lamp as measured in an integrating sphere is shown as an asterisk at coordinates (0.4125, 0.4009). As shown in FIG. 10, the chromaticity of the test lamp as measured by the integrating sphere clearly fits within the ANSI boundary 30, and can fairly be characterized as having a color temperature of 3,500 degrees Kelvin. If testing was taking place with an integrating sphere, a computer could determine whether the results from the test fall within the ANSI boundary, and issue a corresponding pass or fail for the unit under test.

To correlate the testing results from an integrating sphere to the testing results in a testing box, a test lamp that has demonstrated the proper color temperature in an integrating sphere is then tested in the testing box. FIG. 10 also shows the chromaticity output 32 of the same test lamp measured by a testing box according to an exemplary embodiment of the present invention, wherein the result is represented by "dot" at coordinates (0.4107, 0.3968). As shown in FIG. 10, the same test lamp produced slightly different chromaticity results when measured in the testing box compared to when measured by the integrating sphere.

FIG. 10 also illustrates how the results from a testing box can be correlated to the results from an integrating sphere. As can be seen, there is a linear relationship between chromaticity output 32 measured by the testing box compared to the chromaticity output 31 measured by the integrating sphere. Accordingly, the ANSI boundary 30 quadrilateral may be shifted similar to the linear relationship between chromaticity output measured 32 by the testing box compared to the chromaticity output 31 measured by the integrating sphere of obtain an end of line (EOL) shifted boundary 33. A computer may then be programmed with the EOL shifted boundary 33, wherein the quadrilateral is the shifted boundaries as determined by the difference between the chromaticity output 32 measured by the testing box compared to the chromaticity output 31 measured by the integrating sphere. Once the computer is programmed with the new boundaries, the testing box can be used in place of the integrating sphere in the manufacturing line. In an exemplary embodiment, a statistically significant number of test lamps are tested in the integrating sphere and the testing box, and an average (or other statistical correlation to derive a point from the results) is created to determine the appropriate distance to move or shift the quadrilateral boundary.

The boundaries illustrated in FIG. 10 are defined by the following coordinates for an exemplary testing box correlation.

| 3500K BOUNDARY | | x | y |
|---|---|---|---|
| ANSI BOUNDARY | | | |
| Center Point | | 0.4073 | 0.3917 |
| ANSI quadrangle | (x1, y1) | 0.4299 | 0.4165 |
| | (x2, y2) | 0.3996 | 0.4015 |
| | (x3, y3) | 0.3889 | 0.3690 |
| | (x4, y4) | 0.4147 | 0.3814 |
| MEASURED POINTS | | | |
| 6" Correlation Module Sphere | | 0.4125 | 0.4009 |
| 6" Correlation Module EOL | | 0.4107 | 0.3968 |
| Shifted Vector Difference | | −0.0018 | −0.0041 |
| END OF LINE BOUNDARY | | | |
| Center Point | | 0.4055 | 0.3876 |
| SHIFTED quadrangle | (x1, y1) | 0.4281 | 0.4124 |
| | (x2, y2) | 0.3978 | 0.3974 |
| | (x3, y3) | 0.3871 | 0.3649 |
| | (x4, y4) | 0.4129 | 0.3773 |

Figure 11:
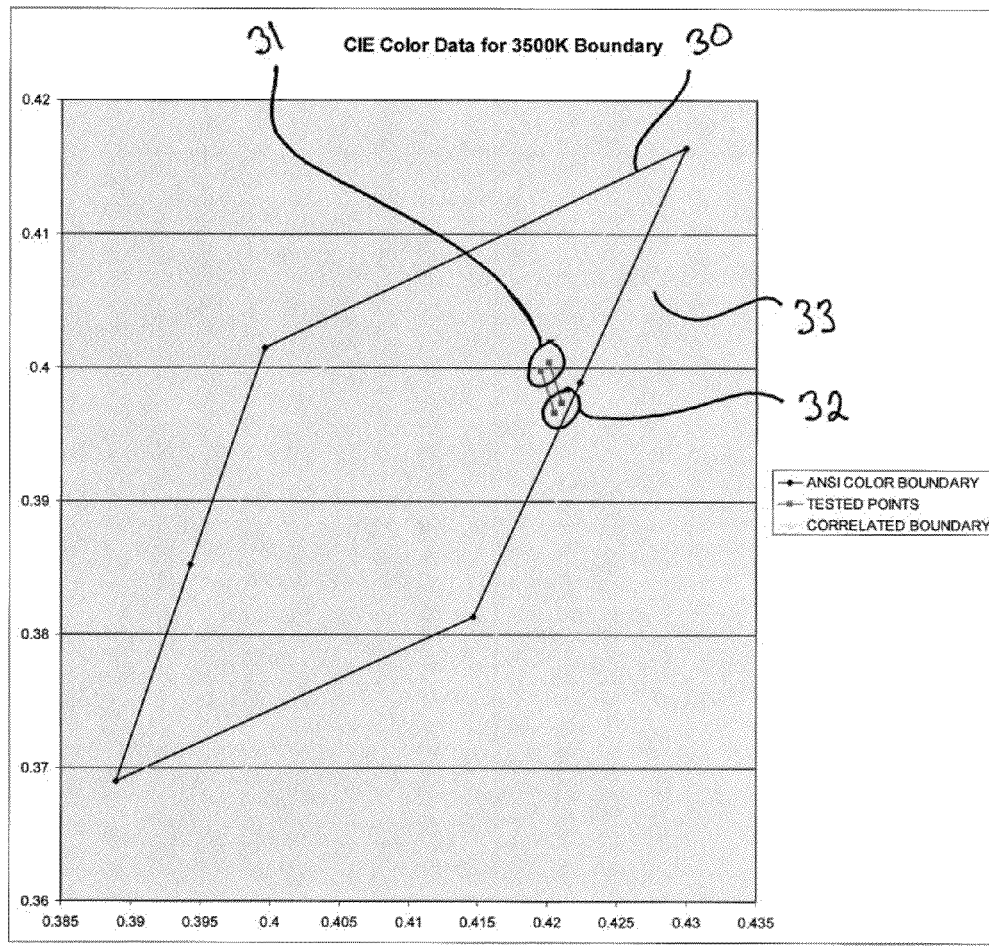
FIG. 11 is a graph of an ANSI boundary and End of Line boundary for a different testing box than that of FIG. 10, for nominal color temperature 3500K.

FIG. 11 illustrates a graph for boundaries of another testing box correlation. As in the prior example, this example provides CIE color data for 3500K. FIG. 11 shows a graph wherein the x-axis is CIE x and the y-axis is CIE y. The ANSI boundary 30 for chromaticity lamp output, which is a quadrilateral, can fairly be characterized as having a color temperature of 3,500 degrees Kelvin. The chromaticity outputs 31 of two different test lamps as measured in an integrating sphere are shown at approximate coordinates (0.419, 0.399) and (0.420, 0.401). As shown in FIG. 11, the chromaticity of the two test lamps as measured by the integrating sphere clearly fits within the ANSI boundary 30, and can fairly be characterized as having a color temperature of 3,500 degrees Kelvin. To correlate the testing results from an integrating sphere to the testing results in a testing box, the two test lamps that demonstrated the proper color temperature in the integrating sphere are then tested in the testing box. FIG. 11 also shows the chromaticity outputs 32 of the same two test lamps measured by a testing box, wherein the outputs are shown at approximate coordinates (0.421, 0.397) and (0.422, 0.398). Because both of the test lamps shifted similarly between the integrating sphere and the testing box, one may have greater confidence that the shift correlation is accurate. Based on the shift of the two test lamps, the correlated boundary 33 for the testing box is calculated and plotted on the graph.

It should be noted that the correlation shift illustrated in FIG. 10 is different from the correlation shift illustrated in FIG. 11. This is because the correlation shift is unique to individual testing boxes. Different testing boxes were correlated, such that the correlation shifts were different.

According to embodiments of the invention, color characteristics are correlated. In this context, color characteristics may include color temperature and CIE chromaticity coordinates (from which color temperature may be calculated).

Further, it should be noted that there are several different "color space" diagrams, which are used by persons of skill in the art, in addition to the CIE (x, y) diagram. Different revisions of diagrams have been published, which are merely transformations of each other or different ways to assess color quality. For example, one may plot color in units of (x, y) or (u, v) or (u', v'). The concept is the same as for the CIE (x, y) diagram but the data is plotted against a different scale on the axes. Any color space known to persons of skill in the art may be used with the present invention. For example, but not limited to, the CIE 1931 chromaticity coordinates and diagram. Color spaces include, but are not limited to, the CIE 1931 chromaticity diagram, the CIE 1964 chromaticity diagram, and the CIE 1976 chromaticity diagram.

There are several methods that can be used to determine whether a chromaticity output falls within a boundary. There are several methods that can be used to determine whether the chromaticity value (or any other light characteristic) falls within an allowable or specified range. One of skill in the art would understand that any suitable two-dimensional mathematical algorithm can be used to test whether a single point lies inside or outside an enclosed bounding polygon. For example, one of skill in the art would understand that a "winding number" algorithm can be used to determine whether a given point falls within an arbitrary polygon. Other algorithms, such as a "crossing number" algorithm can also be used.

A similar method can be used to correlate the quantity of light measured in the integrating sphere with the quantity of light measured in the testing box. For example, if a reference lamp is measured at 1000 lumens in the integrating sphere, but that same reference lamp measures 800 lumens in the testing box, then a relationship between the actual lumen output, as measured in the integrating sphere and the tested lumen output, as measured in the testing box of all subsequently manufactured lamps, can be shown as:

[Actual Lumen Output]=[Lumen Output Measured in Testing Box]×[1000/800 lumens]

In this regard, then, the actual lumen output of the lamp can be determined based on a measurement taken in the testing box. As with the chromaticity coordinates, in an exemplary embodiment, a statistically significant number of lamps may be measured in both the testing box and the integrating sphere to determine the proper correlation.

As noted above, the testing box may take any shape. The shape and/or the number of sides of the testing box are accounted in the correlation. This procedure works uniquely for each geometry or test sample configuration. This ratio relationship between integrating sphere and test box must be established for each and every different geometry of product being tested. For example, measurements for a 6" diameter recessed downlight are not the same as a 4" diameter recessed downlight. Further, if the same 6" downlight is used with different reflector inserts, it will also change the light measurements. The correlation is unique for even very subtle differences in sample geometry.

Once a correlation between integrating sphere measurements and testing box measurements has been determined for a given testing box and lighting fixture, the testing box can be placed in the production line. Importantly, this leaves the integrating sphere free to test other manufacturing lines, or advantageously, to identify correlations for other testing boxes and other fixtures. In this way, new manufacturing lines can be added without the significant expense involved in purchasing additional integrating spheres.

Figure 12:
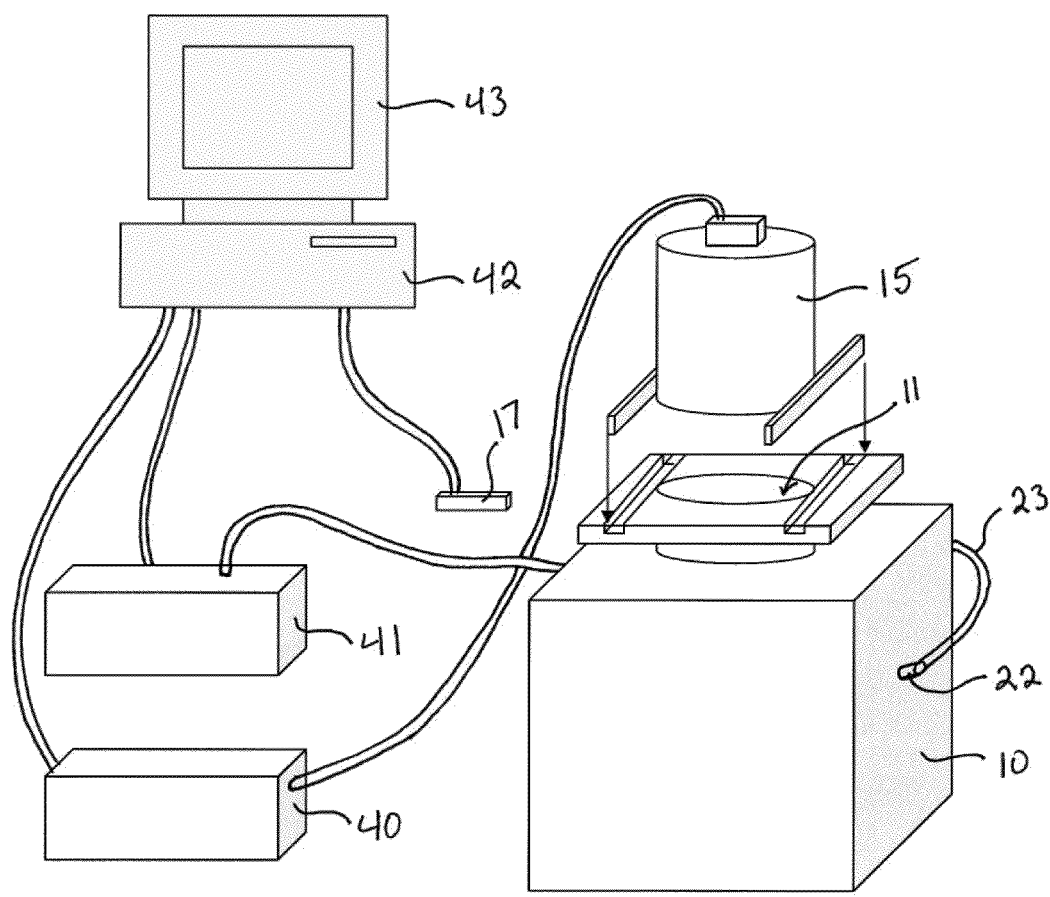
FIG. 12 is a perspective view of an end of line testing station comprising a testing box, a power meter, a spectrometer, and a computer.

Referring to FIG. 12, a testing station is illustrated for measuring the color temperature of the light output from fixture lamp (expressed in degrees Kelvin) and the total light output from the fixture lamp (expressed in lumens) is illustrated. The system comprises a testing box 10, wherein a fixture 15 may be positioned at an opening 11 of the testing box 10. The testing box 10 has a light sensor 22 protruding through a side wall of the testing box 10. In a simple form, the light sensor 22 may be an exposed end of a fiber optic cable. A spectrometer 41 is connected to the light sensor 22 via a fiber optic cable 23. A power meter 40 is electrically connected to the current driver of the fixture 15 to measure the power being supplied to the lamp in the fixture 15. A computer 42 is provided to receive inputs from the power meter 40 and the spectrometer 41. A monitor 43 is connected to the computer 42 to provide the testing station technician feedback as to the results of the tests. The computer 42 also receives inputs from a bar code scanner 17, wherein bar code labels may be used to identify individual fixtures being tested so that test results may be associated with light fixtures being tested. The end of line testing station may also be set up with conveyors or other devices to deliver and/or take away lamps or fixtures from the tray. Any systems known to persons of skill may be employed to speed the testing process and enable quicker flow of products through the station.

Figure 13:
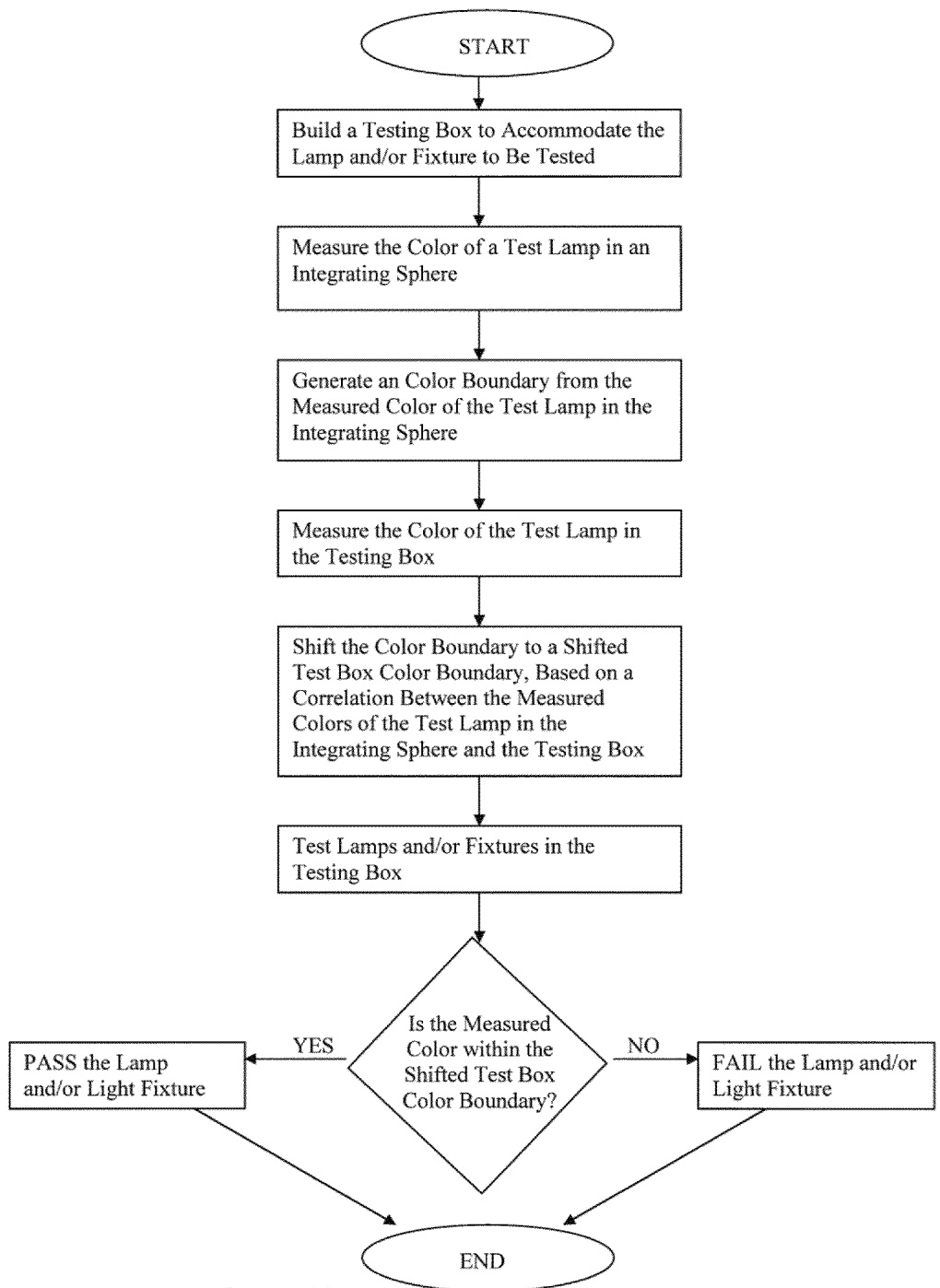
FIG. 13 is a flow chart of a process for end of line testing of lamps and/or fixtures, wherein light color is the testing criteria.

Referring to FIG. 13, a method for end of line testing of lamps and/or light fixtures is illustrated as a flow chart. First, a testing box is built to accommodate the particular type of lamp and/or fixture to be tested at the end of the production line. Second, a test lamp is measured for color in an integrating sphere. Third, a color boundary is generated from the measured color of the test lamp in the integrating sphere. Fourth, the test lamp is measured for color in the testing box. Next, the color boundary is shifted to a shifted test box color boundary, based on a correlation between the measured colors of the test lamp in the integrating sphere and the testing box. End of line test the lamps and/or light fixtures in the testing box. If the color of the lamp and/or light fixture, as measured in the testing box, is within the shifted test box color boundary, then PASS the lamp and/or light fixture and certify that it has the measured color. If the color of the lamp and/or light fixture, as measured in the testing box, is not within the shifted test box color boundary, then FAIL the lamp and/or light fixture.

Figure 14:
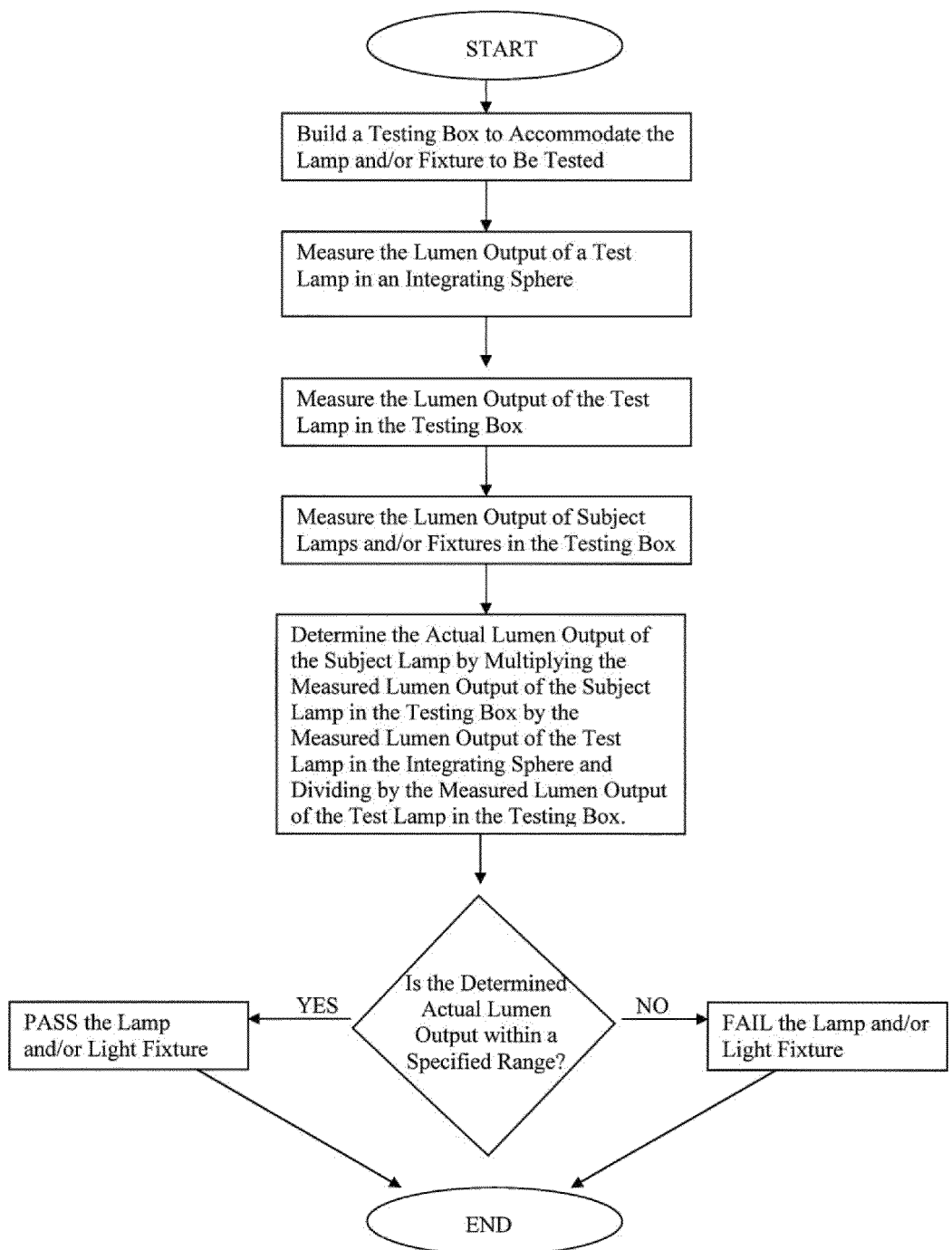
FIG. 14 is a flow chart of a process for end of line testing of lamps and/or fixtures, whereby actual lumen output is the testing criteria.

Referring to FIG. 14, a method for end of line testing of lamps and/or light fixtures is illustrated as a flow chart, whereby actual lumen output is the testing criteria. First, a testing box is built to accommodate the particular type of lamp and/or fixture to be tested at the end of the production line. Second, the lumen output of a test lamp is measured in an integrating sphere. Third, the lumen output of a test lamp is measured in the testing box. Fourth, the lumen output of a subject lamp is measured in the testing box. Fifth, the actual lumen output of the subject lamp is determined by multiplying the measured lumen output of the subject lamp in the testing box by the measured lumen output of the test lamp in the integrating sphere and dividing by the measured lumen output of the test lamp in the testing box. If the determined actual lumen output of the subject lamp and/or light fixture, as measured in the testing box, is within specified lumen output range, then PASS the lamp and/or light fixture and certify that it has the specified lumen output. If the determined actual lumen output of the subject lamp and/or light fixture, as measured in the testing box, is not within the specified lumen output range, then FAIL the lamp and/or light fixture.

Although the disclosed embodiments are described in detail in the present disclosure, it should be understood that various changes, substitutions and alterations can be made to the embodiments without departing from their spirit and scope.

What is claimed is:

1. A method, comprising:
   obtaining a first color measurement of a first light source in a reference measuring device, the first measurement defining a first point within a first area on a color space diagram, the first area defining a color criterion;
   obtaining a second color measurement of the first light source in a testing measuring device, the second measurement defining a second point on the color space diagram;
   determining a vector difference between the first point and the second point;
   determining a second area on the color space diagram by shifting the first area according to the vector difference;
   obtaining a third color measurement of a second light source in the testing measuring device, the third color measurement defining a third point on the color space diagram; and
   determining whether the second light source meets the color criterion based on whether the third point is in the second area.

2. The method of claim 1, wherein the reference measuring device is an integrating sphere.

3. The method of claim 1, wherein the testing measuring device is a box.

4. The method of claim 1, wherein the testing measuring device comprises a light box.

5. The method of claim 4, wherein the testing measuring device further comprises a spectrometer coupled to the light box.

6. The method of claim 1, wherein the first light source comprises a first LED.

7. The method of claim 1, wherein the second light source comprises a second LED.

8. A method for light source testing, the method comprising:
   providing a testing box capable of accommodating a light source;
   measuring chromaticity of a test light source in an integrating sphere;
   generating a color boundary for the measured chromaticity of the test light source in the integrating sphere, the color boundary defining a first quadrangle of chromaticity coordinates;
   measuring chromaticity of the test light source in the testing box;
   defining a second quadrangle of chromaticity coordinates by shifting the color boundary based on a correlation between the measured chromaticities of the test light source in the integrating sphere and the testing box;
   obtaining a chromaticity measurement of the light source in the testing box, the chromaticity measurement comprising a first value in a first dimension and a second value in a second dimension; and
   passing or failing the light source based on whether the first value in the first dimension and the second value in the second dimension define a point in the second quadrangle.

9. The method of claim 8, wherein the providing a testing box comprises providing a testing box comprising: an enclosure comprising an opening for receiving the light source; and a sensor of light emitted inside the enclosure.

10. The method of claim 9, wherein the sensor comprises a spectrometer.

11. The method of claim 8, wherein the generating a color boundary comprises generating a color boundary for the chromaticity measured in the integrating sphere using a spectrometer.

12. A method comprising the steps of:
   obtaining a first color measurement of a test lamp using an integrating sphere;
   obtaining a second color measurement of the test lamp using a light box;
   generating, from the first color measurement, a first quadrangle that defines a first range of chromaticity coordinates;
   generating a second quadrangle that defines a second range of chromaticity coordinates and that is shifted from the first quadrangle according to a vector difference between the first color measurement and the second color measurement;
   obtaining a third color measurement of another lamp using the light box; and
   passing or failing the another lamp based on whether the third color measurement is within the second quadrangle.

* * * * *